United States Patent
Michel et al.

(10) Patent No.: US 6,724,865 B1
(45) Date of Patent: Apr. 20, 2004

(54) ARRANGEMENT FOR MEASURING RESPONSE TIMES IN A VOICE RESPONSE SYSTEM USING A BULK CALL GENERATOR

(75) Inventors: Jeffrey Russell Michel, Richmond, VA (US); Thomas Bryant Sealey, II, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 09/671,306

(22) Filed: Sep. 28, 2000

(51) Int. Cl.[7] ............................................. H04M 11/00
(52) U.S. Cl. ................... 379/88.18; 379/10.02
(58) Field of Search .................. 379/27.04, 27.02, 379/24, 10.02, 1.02, 1.01, 1.03, 1.04, 67.1, 10.01, 29.01, 88.18

(56) References Cited

U.S. PATENT DOCUMENTS

| | | | | |
|---|---|---|---|---|
| 5,448,624 A | * | 9/1995 | Hardy et al. | 379/27.02 |
| 5,553,121 A | * | 9/1996 | Martin et al. | 379/88.01 |
| 5,633,909 A | * | 5/1997 | Fitch | 379/29.01 |
| 5,933,475 A | * | 8/1999 | Coleman | 379/10.01 |
| 6,411,679 B1 | * | 6/2002 | Khasnabish | 379/22.02 |

* cited by examiner

Primary Examiner—Fan Tsang
Assistant Examiner—Gerald Gauthier
(74) Attorney, Agent, or Firm—Leon R. Turkevich

(57) ABSTRACT

A bulk call generator is configured for measuring the response time of a telephony-based interactive response system by detecting the presence of prescribed signaling messages and in-band prompts, where the in-band prompts include tones (such as DTMF tones) recognizable by the bulk call generator. In particular, the tones enable the bulk call generator to uniquely identify a corresponding message, for example a test greeting generated by the telephony-based interactive response system, or a test message retrieved for playback by the telephony-based interactive response system. Hence, the bulk call generator can measure the response time across all channels of a telephony-based interactive response system in an economic and scalable manner, for verification that prescribed prompts and/or messages are played by the telephony-based interactive response system.

47 Claims, 4 Drawing Sheets

ARRANGEMENT FOR MEASURING RESPONSE TIMES IN A VOICE RESPONSE SYSTEM USING A BULK CALL GENERATOR

BACKGROUND OF THE INVENTION

1. Field of the Invention

The present invention relates to systems for testing telephony-based interactive response systems such as messaging platforms based on using bulk call generators configured for generating DTMF digits according to prescribed scripts.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. One such example includes unified communications systems that provide messaging services for users by providing an integrated platform for the storage and retrieval of different types of messages, such as voicemail, e-mail, fax, etc.

An important consideration in developing and testing an interactive response system is the ability to test the interactive response system (i.e., device under test) under conditions that would normally be encountered during deployment of the device under test. For example, a messaging system configured for receiving multiple call channels (e.g., 100 call channels) needs to be able to reliably handle multiple requests received on the respective call channels. Conventional testing systems use bulk call generators, such as the Ameritec AM2-DX Self-Contained ISDN PRI (T1) Call Generator, for generating simulated loads by generating DTMF digits on multiple call channels, according to prescribed scripts. In particular, the script specifies playing a single DTMF digit or a sequence of DTMF digits, followed by playing another DTMF digit (or sequence thereof) after waiting a prescribed time interval (e.g., waiting a prescribed number of seconds).

Although bulk call generators are helpful in generating a simulated load for a device under test, bulk call generators to date are not configured for measuring (i.e., quantifying) the performance characteristics of the device under test under increasing load conditions. In particular, the increased use of processor resources within the interactive response system during load conditions may result in a greater delay in responding to requests, for example requests to initiate a prompt or requests to retrieve a message. Hence, there is a need for the ability to quantitatively measure the performance characteristics of the device under test under increasing load conditions.

A problem in measuring the performance characteristics involves identifying whether the appropriate message or prompt was played at a given point in time: although bulk call generators can be configured by scripts to generate a prescribed sequence of DTMF digits that simulate a prompt sequence input by a user, the bulk call generators are incapable of interpreting a spoken prompt for content. Moreover, speech recognition resources have severe processing requirements, hence are not practical additions to the bulk call generator in an attempt to interpret a prompt for content.

SUMMARY OF THE INVENTION

There is a need for an arrangement that enables a bulk call generator to measure the response time of a telephony-based interactive response system in an economical and scalable manner.

These and other needs are attained by the present invention, where a bulk call generator is configured for measuring the response time of a telephony-based interactive response system by detecting the presence of prescribed signaling messages and in-band prompts, where the in-band prompts include tones (such as DTMF tones) recognizable by the bulk call generator. In particular, the tones enable the bulk call generator to uniquely identify a corresponding message, for example a test greeting generated by the telephony-based interactive response system, or a test message retrieved for playback by the telephony-based interactive response system. Hence, the bulk call generator can measure the response time across all channels of a telephony-based interactive response system in an economic and scalable manner, for verification that prescribed prompts and/or messages are played by the telephony-based interactive response system.

One aspect of the present invention provides a method in a bulk call generator of measuring a response time of a telephony-based interactive response system. The method includes sending a command to the telephony-based interactive response system for at least one of deposit of a message and retrieval of a message, and measuring a response time for the telephony-based interactive response system to respond to the command. The measurement of a response time for the telephony-based interactive response system enables test engineers to measure the performance of a device under test, namely the telephony-based interactive response system, as the device under test is dynamically loaded with increasing loads, using a conventional bulk call generator with minimal modifications.

Another aspect of the present invention provides a test system comprising a bulk call generator and a telephony-based interactive response system. The bulk call generator is configured for measuring a response time based on reception of a prescribed response to a sent command. The telephony-based interactive response system is configured for outputting prescribed responses to received commands, the prescribed responses including signaling responses and in-band responses. Each in-band response includes a corresponding unique tone recognizable by the bulk call generator, where the bulk call generator is configured for measuring the response time for a selected one of the in-band prescribed responses based on detection of the corresponding unique tone.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
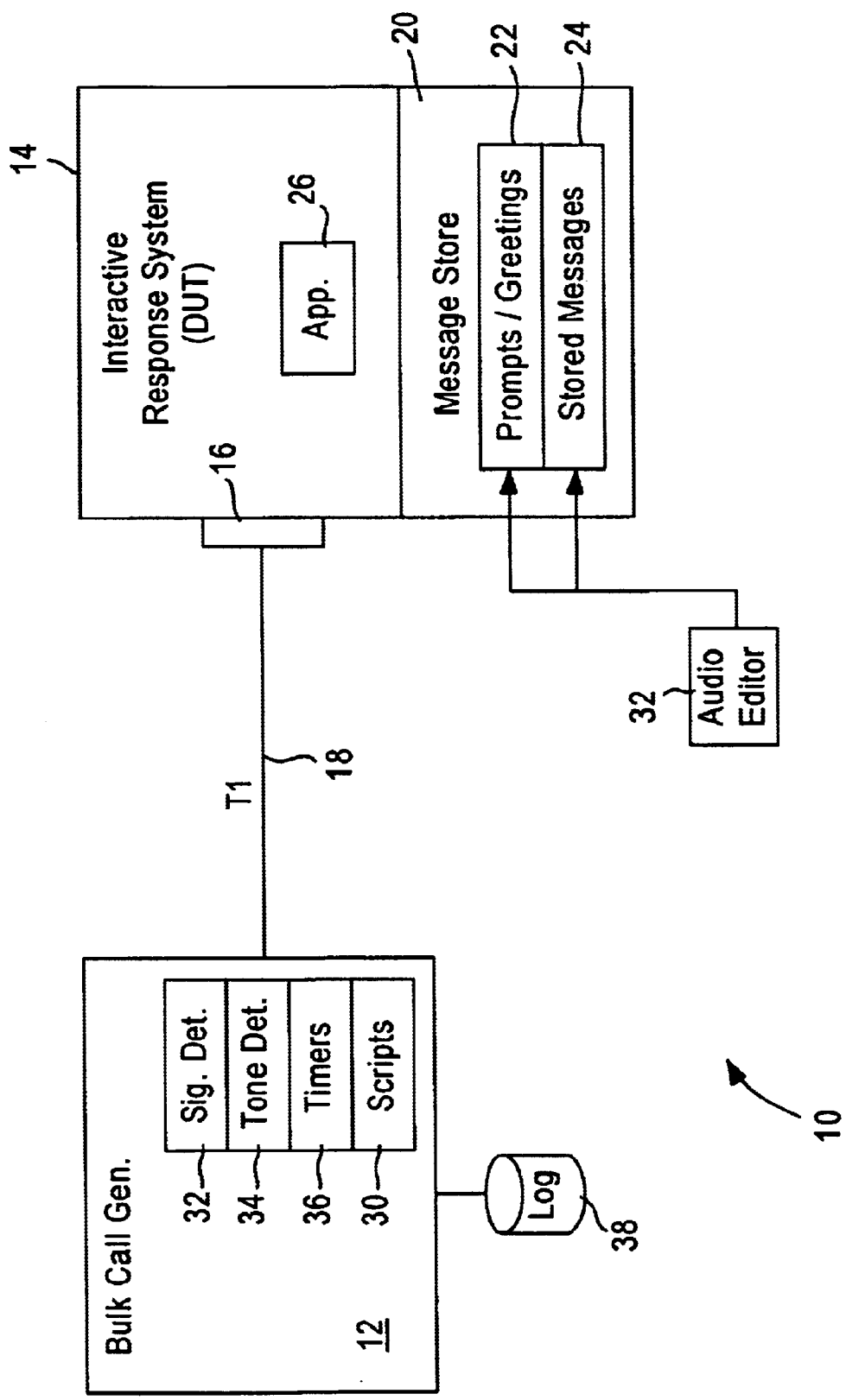
FIG. 1 is a block diagram illustrating a test system, using a bulk call generator for testing a telephony-based interactive response system, according to an embodiment of the present invention.

FIG. 1 is a block diagram illustrating a test system for measurement of response times in a telephony-based interactive response system. The test system 10 includes a bulk call generator 12 configured for sending commands, and measuring response times based on reception of prescribed responses to the sent command. An exemplary bulk call generator 12 is the Ameritec AM2-DX Self-Contained ISDN PRI (T1) Call Generator. The test system also includes the device under test (DUT) 14, namely the telephony-based interactive response system, which may be a unified messaging system such as the commercially available Cisco Unified Open Network Exchange (Cisco uOne) (Products UONE-FOUND 4.1S, and UONE-VOICEMSG4.1S) from Cisco Systems, Inc. The interactive response system 14 includes a telephony interface 16 configured for receiving telephony-based requests from the bulk call generator 12, for example in-band dual tone multiple frequency (DTMF) signals, or out of band telephony based signaling messages via a T1 link 18. The interactive response system 14 also includes a message store 20 configured for storing prerecorded prompts and greetings 22, and messages 24 that are left by callers to the messaging system. Note that the message store 20 may be implemented across distributed servers, where the messages 24 may be stored in a separate IMAP directory accessible by the interactive response system 14.

The interactive response system 14 also includes an application runtime environment 26 configured for executing the requests generated by the bulk call generator 12 by execution of a messaging application. Hence, the application runtime environment 26, in response to receiving a request for a message, accesses the appropriate prompt 22 or stored message 24 from the message store 20 and outputs the response to the bulk call generator commands via the interface 16.

As described above, test engineers monitoring the performance of the interactive response system 14 executing the messaging application 26 need to be able to measure the performance of the interactive response system 14 as the loading is increasing. In particular, the disclosed embodiment addresses the need for measuring the response time of the interactive response system 14 across each channel of the T1 link 18 to insure the interactive response system 14 meets all operating and performance requirements necessary for deployment.

According to the disclosed embodiment, test scripts 30 are loaded for execution into the bulk call generator 30 that not only provide load to the interactive response system 14, but also measure the response times for depositing and retrieval of a message. In particular, the bulk call generator 12 includes signaling detectors 32 configured for detecting signaling responses from the interactive response system 14, and tone detectors 34 configured for detecting in-band tones such as individual tones or DTMF tones that are inserted into the prompts 22 and stored messages 24. The bulk call generator 12 also includes timers 36 configured for measuring, on each T1 channel, specified response times for the interactive response system 14 to respond to commands output by the bulk call generator 32. Upon detecting the necessary signaling response or in-band tones from the interactive response system 14, the bulk call generator 12 stores the measured response time in a log file 38 for evaluation. Hence, the test scripts 30 configure the bulk call generator 30 to track statistics for response times and any failures (e.g., failure to detect the correct prompt or greeting) across all the channels of the link 18.

The in-band tones are inserted into the prompts 22 and the stored messages 24 using an audio editor 32, for example the commercially available digital audio software editor Cool Edit Pro, available from Broadcast Software International, Eugene Oreg. (currently available for download via the World Wide Web at http://www.bsiusa.com/software/coolpro/coolpro.shtml).

Hence, the bulk call generator 12 can be configured using the test scripts 30 to measure the response times for the interactive response system 14 to retrieve and play prescribed prompts 22 or stored messages 24 in response to commands sent by the bulk call generator 12. In addition, the test scripts 30 configure the bulk call generator to ensure the test is synchronized with the device under test across all channels.

Figure 2A:
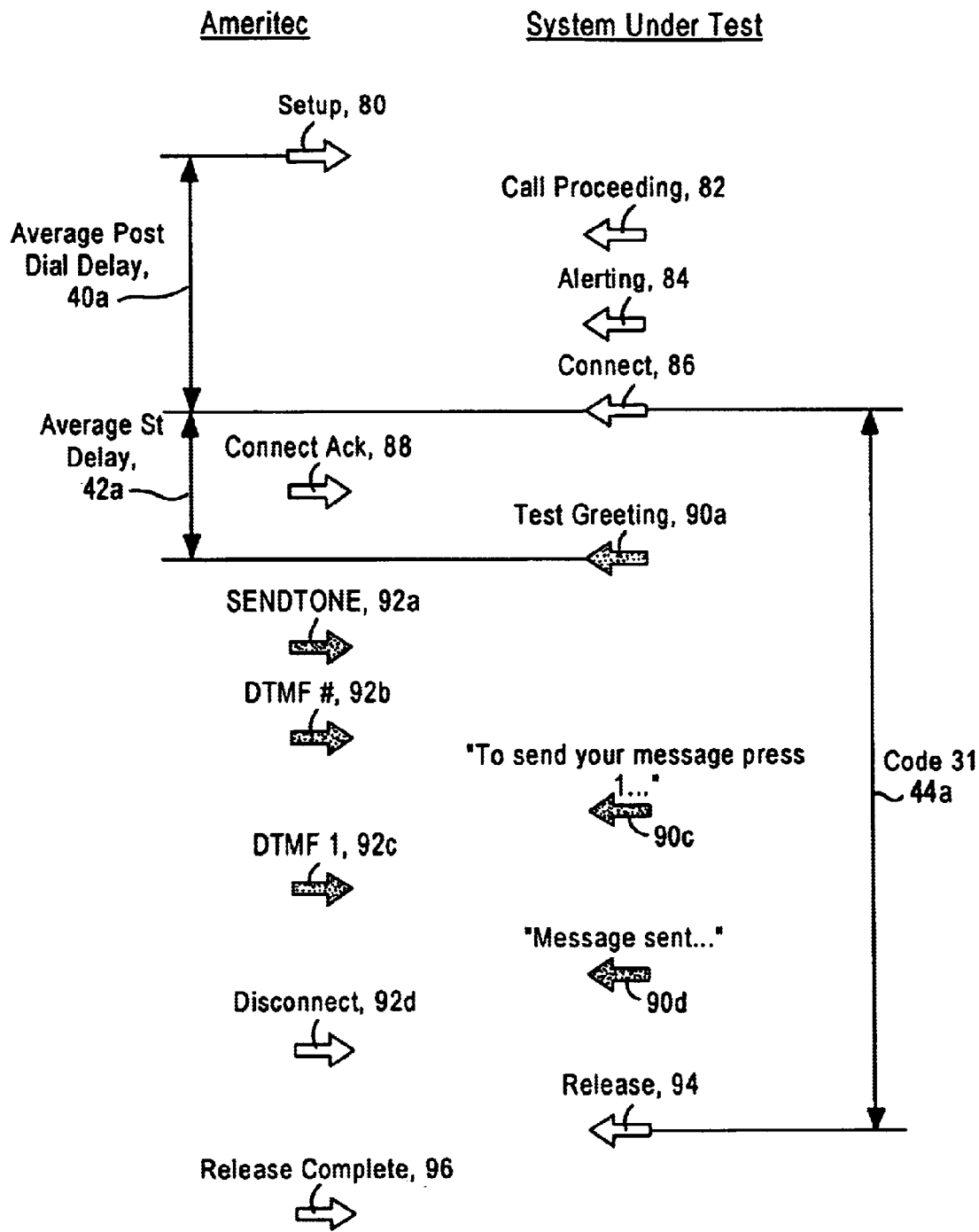
FIGS. 2A and 2B are call flow diagrams illustrating the transfer of requests and responses between the bulk call generator and the telephony-based interactive response system of FIG. 1.
Figure 2B:
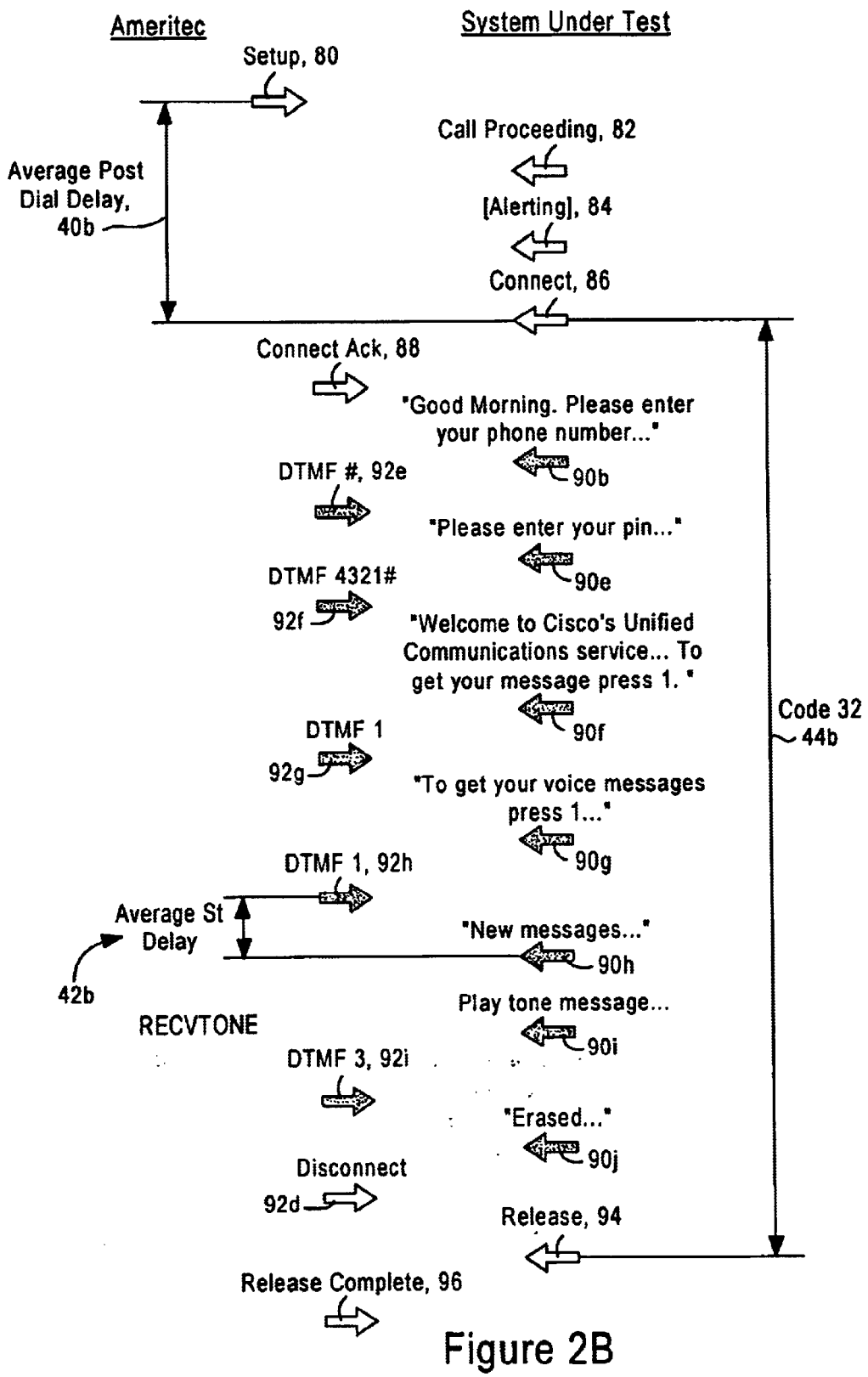

FIGS. 2A and 2B are diagrams illustrating exemplary call flows by the bulk call generator 12 in testing the interactive response system 14. FIG. 2A illustrates a call flow for a script 30 configured for depositing a message 24 (illustrated as tone 92a) within the message store 20, and measuring prescribed response times such as an average post dial delay 40, an average response time 42, and a call duration 44. FIG. 2B illustrates a call flow for another script 30 configured for retrieving a message 24 (illustrated as tone 90i) from the message store 20, and measuring the response times 40, 42, and 44 during retrieval of the message 24 from the message store 20. These call flow diagrams will be described in further detail with reference to FIG. 3.

Figure 3:
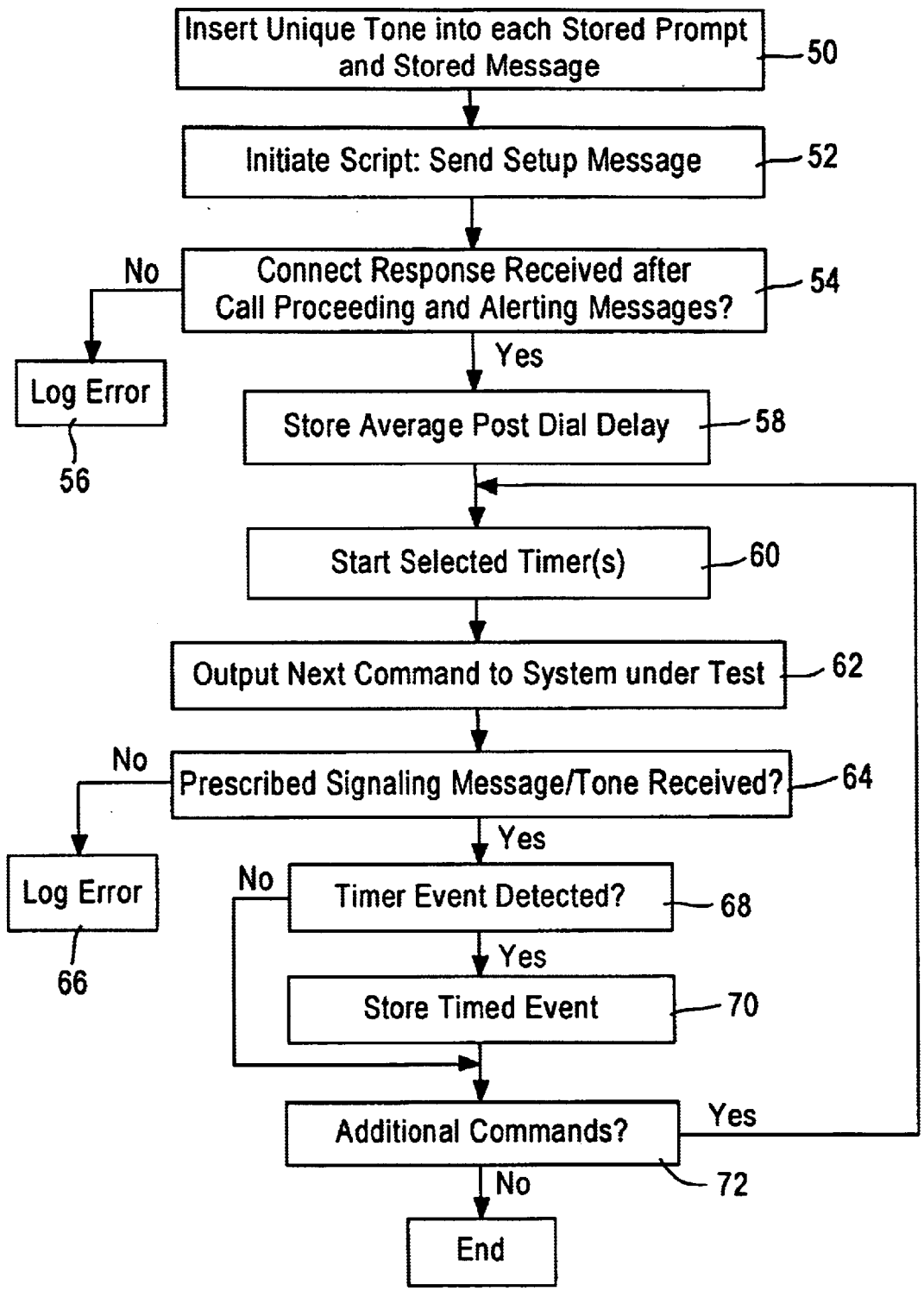
FIG. 3 is a diagram illustrating the method of measuring the response time of the telephony-based interactive response system according to an embodiment of the present invention.

FIG. 3 is a diagram illustrating the method of measuring a response time of the interactive response system 14 according to an embodiment of the present invention. The method can be implemented as executable code stored on a computer readable medium (e.g., a hard disk drive, a floppy drive, a random access memory, a read only memory, an EPROM, a compact disc, etc.). Prior to initiating testing of the interactive response system 14, unique tones (e.g., single frequency tones or DTMF tones) that can be detected by the tone detector 34 are digitally inserted using the audio editor 32 into each prompt 22 and message 24 stored in the message store 20. Hence, the digitally inserted tones enables the bulk call generator 12 to uniquely identify each of the stored prompts 22 and messages 24.

The bulk call generator 12 begins the testing procedure in step 52 by initiating a selected script and sending a setup signaling message 80 on a given T1 channel. Typically, however, the test is synchronized across a prescribed group or all the T1 channels to test the device 14 under load conditions. The setup signaling message 80 typically will include call setup parameters, for example a redirect flag and a redirect dialed number identification string (RDNIS) indicating a calling party attempting to reach a destination number (indicating to the application 26 to begin a greeting for prompting a deposit of a message), or a direct dial flag (indicating to the application 26 that a subscriber is attempting to retrieve messages). The bulk call generator 12 then monitors the T1 channel for detection in step 54 of a prescribed sequence of signaling messages from the interactive response system 14, for example a call proceeding message 82, an alerting message 84, and a connect message

86. If in step 54 the bulk call generator 12 does not detect within a prescribed time interval (e.g., 10 seconds) the prescribed sequence of the call proceeding signaling message 82, the alerting signaling message 84, and the connect signaling message 86, the bulk call generator 12 logs an error in step 56 and resets the connection and the script to retry the call.

If in step 54 the bulk call generator detects the prescribed sequence of signaling messages 82, 84, and 86 from the interactive response system 14, the bulk call generator 12 stores in step 58 as the response time an average post dial delay 40 based on the elapsed time between sending the setup message 80 and receiving the connect message 86. The bulk call generator 12 then starts in step 60 timers specified by the executed script. For example, the bulk call generator 12 starts the average response timer 42*a* and the call duration timer 44*a* for the deposit message call flow in FIG. 2A, or simply starts the call duration timer 44*b* for the retrieve message call flow in FIG. 2B. The bulk call generator 12 also outputs the next command (e.g., the connect acknowledgment signaling message 88) in step 62.

The interactive response system 14 responds to the connect acknowledgment 88 by retrieving from the message store 20 the appropriate prompt/greeting 22, and playing the retrieved prompt/greeting 22, illustrated as greetings 90*a* and 90*b* in FIGS. 2A and 2B, respectively. As described above, each prompt/greeting 22 (including the greetings 90*a* and 90*b*) and stored message 24 includes a tone recognizable by the tone detector 34 within the bulk call generator 12. Hence, the bulk call generator 12 is able to determine in step 64 whether the appropriate response has been received, regardless of whether the response is a signaling message or an in-band tone within a played greeting.

If in step 64 the prescribed signaling message or tone is not detected by the bulk call generator 12, an error message is logged in step 66, for example that specifies the last transmitted request from the bulk call generator 12, and the response received from the interactive response system 14 that generated the error. Hence, the bulk call generator 12 can be used to validate that the appropriate sequence of prompts is being retrieved by the application 26 executed by the interactive response system 14; moreover, erroneous prompts can be identified for improved troubleshooting of the logic within the application 26.

The bulk call generator 12 waits for the appropriate response, and if in step 64 the prescribed signaling message or tone specified by the executing script is detected by the bulk call generator 12, the bulk call generator checks in step 68 whether the prescribed signaling message or received tone (e.g., test greeting 90*a*) corresponds to a timer event. For example, reception of the test greeting 90*a* in the deposit message call flow of FIG. 2A corresponds to completion of the measurement of the average response time 42*a*; hence, the measured average response time 42*a* is stored in the log 38 in step 70. In contrast, the greeting 90*b* is only one of multiple in band greetings 90 that are successively played in response to tone-based commands 92 (e.g., DTMF inputs); hence, the bulk call generator 12 determines that additional commands are necessary in step 72, and repeats steps 60 through 72 as specified by the executed script until detection of the final event, typically the release signaling message 94.

As illustrated in FIG. 2A, the bulk call generator 12 outputs a send tone as a prescribed tone 92*a* representing the message to be stored, followed by a prescribed DTMF signal 92*b* representing a stop recording command, and in response detects a menu prompt 90*c* based on the corresponding received tone. The bulk call generator 12 then outputs another DTMF signal 92*c* as a command based on the menu prompt 90*c*, resulting in detection of an acknowledgment message 90*d* based on the corresponding received tone. In response to detecting the received tone for the acknowledgment message 90*d*, the bulk call generator generates a disconnect signaling message 92*d*, causing the interactive response system 14 to generate a release signaling message 94. The detection of the release signaling message 94 causes the bulk call generator 12 to store the call duration 44*a* for the deposit message call flow in a prescribed location (e.g., code 31) within the log 38. The bulk call generator 12 completes the signaling by sending a release complete signaling message 96.

FIG. 2B is a diagram illustrating a call sequence for retrieval of a stored message 24, illustrated as a tone message 90*i*. In response to detecting the welcome prompt 90*b* based on detection of the corresponding tone, the bulk call generator 12 supplies a sequence of DTMF digits 92*e* representing a subscriber's telephone number. The bulk call generator 12, in response to detecting a personal identification number (PIN) prompt 90*e* based on detection of the corresponding tone, outputs a sequence of DTMF digits 92*f* representing the subscriber's password. The interactive response system 14 in response outputs a greeting 90*f*, including the corresponding tone, representing a top level menu for the messaging service. The bulk call generator 12 in response generates a DTMF digit 92*g* representing a command for retrieval of messages. In response to detecting a voice message prompt 90*g* based on the corresponding tone, the bulk call generator 12 outputs a DTMF digit 92*h* representing a request for retrieval of stored voice messages 24. Note that the bulk call generator 12 also initiates a timer 36 for measuring the response time for the average time for retrieving a voice message (stored in the average start delay report code of the bulk call generator 12) 42*b*.

The interactive response system 14 responds to the request 92*h* for retrieval of stored voice messages by first playing a new message announcement 90*h* having a corresponding identifying tone, followed by playing a tone message 90*i* representing a sample stored message. Note the tone message 90*i* may be the same tone message 92*a* previously stored according to FIG. 2A. In response to detecting the tone corresponding to the new message announcement 90*h*, the bulk call generator stores the time interval 42*b* in the log 38. The bulk call generator 12 also outputs another DTMF digit 92*i* requesting deletion of the message; in response to detecting the tone corresponding to acknowledgment of the deleted message 90*j*, the bulk call generator 12 outputs the disconnect signaling message 92*d*, and completes measuring the call duration 44*b* in response to detecting the release signaling message 94. The bulk call generator 12 acknowledges the release signaling message 94 by sending a release complete signaling message 96.

According to the disclosed embodiment, a conventional bulk call generator 12 may be configured, using programmable scripts 30, to measure the response times of interactive response systems, such as unified messaging systems, based on detecting prescribed tones inserted within prompts and messages stored for retrieval by the interactive response system. The timing of response times based on detected tones can be easily implemented with minimal processing requirements, ensuring that the scalability of the bulk call generator 12 is maintained. Moreover, the scripts 30 enable statistics to be tracked for failures across all channels, including failure to detect the correct prompt or greeting. The programmable scripts 30 also synchronize the test with the device under test across all channels, and waits for a prescribed response. In contrast, prior bulk call generators merely waited a prescribed number of seconds before supplying additional DTMF digits. Hence, the programmable scripts enable statistical tracking and synchronization, along with response time measurement, using a conventional bulk call generator.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a bulk call generator of measuring a response time of a telephony-based interactive response system, the method comprising:
    sending a command to the telephony-based interactive response system for at least one of deposit of a message and retrieval of a message; and
    measuring a response time for the telephony-based interactive response system to respond to the command, wherein the measuring step includes:
        detecting a presence of a prescribed response to the command from the telephony-based interactive response system based on detecting a prescribed tone, recognizable by the bulk call generator, within the prescribed response outputted by the telephony-based interactive response system; and
        storing as the response time a time interval between the sending of the command and the detected presence of the prescribed response.

2. The method of claim 1, wherein:
    the sending step includes sending a setup command to the telephony-based interactive response system; and
    the detecting step includes detecting a connect signaling message from the telephony-based interactive response system.

3. The method of claim 2, wherein the detecting step includes detecting in sequence a call proceeding signaling message, an alerting signaling message, and the connect signaling message.

4. The method of claim 3, wherein the storing step includes classifying the stored response time as an average post dial delay.

5. The method of claim 1, wherein the sending step includes inserting into the command a field specifying one of a request for deposit of message and a request for retrieval of message.

6. The method of claim 5, wherein the detecting step includes detecting a first tone, recognizable by the bulk call generator, indicating a test greeting from the telephony-based interactive response system in response to reception of the request for deposit of message.

7. The method of claim 5, further comprising:
    successively sending a sequence of menu commands; and
    detecting respective prescribed responses to the menu commands;
    the storing step storing the response time based on at least one of the detected prescribed responses.

8. The method of claim 7, wherein storing step stores a call duration representing an interval between reception of a connect signaling message and a final prescribed response from the telephony-based interactive response system and based on detection of the respective prescribed responses according to the sequence.

9. The method of claim 8, wherein the final prescribed response corresponds to a release signaling message.

10. The method of claim 8, wherein the step of detecting respective prescribed responses includes detecting respective prescribed tones as the responses.

11. The method of claim 8, further comprising measuring a second response time within the sequence of menu commands based on a selected one of the menu commands and a corresponding selected one of the prescribed responses.

12. The method of claim 1, wherein the prescribed tone is a dual tone multiple frequency (DTMF) signal.

13. A test system comprising:
    a bulk call generator configured for measuring a response time based on reception of a prescribed response to a sent command; and
    a telephony-based interactive response system configured for outputting prescribed responses to received commands, the prescribed responses including signaling responses and in-band responses, each in-band response including a corresponding unique tone recognizable by the bulk call generator, the bulk call generator configured for measuring the response time for a selected one of the in-band prescribed responses based on detection of the corresponding unique tone.

14. The test system of claim 13, wherein the bulk call generator is configured for measuring an average post dial delay based on sending a setup command to the telephony-based interactive response system, and detecting a connect signaling response from the telephony-based interactive response system.

15. The test system of claim 13, wherein the bulk call generator is configured for measuring an average response time based on sending a tone representing a prescribed menu command, and detecting from the telephony-based interactive response system a corresponding response tone representing an in-band response to the prescribed menu command.

16. The test system of claim 13, wherein the bulk call generator is configured for measuring a call duration representing an interval between reception of a connect signaling message and a final prescribed response from the telephony-based interactive response system and based on detection of prescribed in-band responses in a prescribed sequence.

17. A telephony-based interactive response system comprising:
    an interface configured for outputting prescribed responses to respective received commands, the prescribed responses including signaling responses and in-band responses; and
    a message store configured for storing the in-band responses, the in-band responses representing at least one of prescribed prompts and stored messages, each in-band response including a corresponding unique tone recognizable by a bulk call generator for measuring a response time of the telephony-based interactive response system.

18. The system of claim 17, wherein at least one of the unique tones is a dual tone multiple frequency (DTMF) tone.

19. A bulk call generator comprising:
    means for sending a command to a telephony-based interactive response system for at least one of deposit of a message and retrieval of a message; and
    means for measuring a response time for the telephony-based interactive response system to respond to the command, wherein the measuring means is configured for:

detecting a presence of a prescribed response to the command from the telephony-based interactive response system based on detecting a prescribed tone, recognizable by the bulk call generator, within the prescribed response outputted by the telephony-based interactive response system; and storing as the response time a time interval between the sending of the command and the detected presence of the prescribed response.

20. The generator of claim 19, wherein:

the sending means is configured for sending a setup command to the telephony-based interactive response system; and the detecting means is configured for detecting a connect signaling message from the telephony-based interactive response system.

21. The generator of claim 20, wherein the detecting means is configured for detecting in sequence a call proceeding signaling message, an alerting signaling message, and the connect signaling message.

22. The generator of claim 21, wherein the storing means is configured for classifying the stored response time as an average post dial delay.

23. The generator of claim 19, wherein the sending means is configured for inserting into the command a field specifying one of a request for deposit of message and a request for retrieval of message.

24. The generator of claim 23, wherein the detecting means is configured for detecting a first tone, recognizable by the bulk call generator, indicating a test greeting from the telephony-based interactive response system in response to reception of the request for deposit of message.

25. The generator of claim 23, wherein:

the sending means includes means for successively sending a sequence of menu commands; and the measuring means includes means for detecting respective prescribed responses to the menu commands, the measuring means storing the response time based on at least one of the detected prescribed responses.

26. The generator of claim 25, wherein the measuring means stores a call duration representing an interval between reception of a connect signaling message and a final prescribed response from the telephony-based interactive response system and based on detection of the respective prescribed responses according to the sequence.

27. The generator of claim 26, wherein the final prescribed response corresponds to a release signaling message.

28. The generator of claim 26, wherein the measuring means is configured for detecting respective prescribed tones as the responses.

29. The generator of claim 26, wherein the measuring means is configured for measuring a second response time within the sequence of menu commands based on a selected one of the menu commands and a corresponding selected one of the prescribed responses.

30. The generator of claim 19, wherein the prescribed tone is a dual tone multiple frequency (DTMF) signal.

31. A computer readable medium having stored thereon sequences of instructions for measuring a response time of a telephony-based interactive response system by a bulk call generator, the sequences of instructions including instructions for performing the steps of:

sending a command to the telephony-based interactive response system for at least one of deposit of a message and retrieval of a message; and measuring a response time for the telephony-based interactive response system to respond to the command, wherein the measuring step includes:

detecting a presence of a prescribed response to the command from the telephony-based interactive response system based on detecting a prescribed tone, recognizable by the bulk call generator, within the prescribed response outputted by the telephony-based interactive response system; and storing as the response time a time interval between the sending of the command and the detected presence of the prescribed response.

32. The medium of claim 31, wherein:

the sending step includes sending a setup command to the telephony-based interactive response system; and the detecting step includes detecting a connect signaling message from the telephony-based interactive response system.

33. The medium of claim 31, wherein the detecting step includes detecting in sequence a call proceeding signaling message, an alerting signaling message, and the connect signaling message.

34. The medium of claim 33, wherein the storing step includes classifying the stored response time as an average post dial delay.

35. The medium of claim 31, wherein the sending step includes inserting into the command a field specifying one of a request for deposit of message and a request for retrieval of message.

36. The medium of claim 35, wherein the detecting step includes detecting a first tone, recognizable by the bulk call generator, indicating a test greeting from the telephony-based interactive response system in response to reception of the request for deposit of message.

37. The medium of claim 35, further comprising instructions for performing the steps of:

successively sending a sequence of menu commands; and detecting respective prescribed responses to the menu commands;

the storing step storing the response time based on at least one of the detected prescribed responses.

38. The medium of claim 37, wherein storing step stores a call duration representing an interval between reception of a connect signaling message and a final prescribed response from the telephony-based interactive response system and based on detection of the respective prescribed responses according to the sequence.

39. The medium of claim 38, wherein the final prescribed response corresponds to a release signaling message.

40. The medium of claim 38, wherein the step of detecting respective prescribed responses includes detecting respective prescribed tones as the responses.

41. The medium of claim 38, further comprising instructions for performing the step of measuring a second response time within the sequence of menu commands based on a selected one of the menu commands and a corresponding selected one of the prescribed responses.

42. The medium of claim 41, wherein the prescribed tone is a dual tone multiple frequency (DTMF) signal.

43. The method of claim 1, wherein the detecting step includes identifying the prescribed tone as representing the prescribed response, the prescribed response being one of a test greeting and a test message.

44. The test system of claim 13, wherein the bulk call generator is configured for identifying each unique tone as representing the corresponding in-band response, at least one of the in-band responses being one of a test greeting and a test message.

45. The system of claim 17, wherein each unique tone is configured for representing the corresponding in-band response, at least one of the in-band responses being one of a test greeting and a test message.

46. The generator of claim 19, wherein the measuring means is configured for identifying the prescribed tone as representing the prescribed response, the prescribed response being one of a test greeting and a test message.

47. The medium of claim 31, wherein the detecting step includes identifying the prescribed tone as representing the prescribed response, the prescribed response being one of a test greeting and a test message.

* * * * *